United States Patent
Symes et al.

(10) Patent No.: US 6,999,985 B2
(45) Date of Patent: *Feb. 14, 2006

(54) SINGLE INSTRUCTION MULTIPLE DATA PROCESSING

(75) Inventors: Dominic Hugo Symes, Cambridge (GB); David James Seal, Cambridge (GB)

(73) Assignee: Arm Limited, Cambridge (GB)

(*) Notice: Subject to any disclaimer, the term of this patent is extended or adjusted under 35 U.S.C. 154(b) by 790 days.

This patent is subject to a terminal disclaimer.

(21) Appl. No.: 09/941,790

(22) Filed: Aug. 30, 2001

(65) Prior Publication Data

US 2002/0040378 A1 Apr. 4, 2002

(30) Foreign Application Priority Data

Oct. 4, 2000 (GB) .............................. 0024311

(51) Int. Cl.
*G06F 7/38* (2006.01)

(52) U.S. Cl. ...................................... 708/524; 708/700
(58) Field of Classification Search ................ 708/208, 708/209, 516, 700, 706, 490, 524, 670
See application file for complete search history.

(56) References Cited

U.S. PATENT DOCUMENTS

| 5,959,874 | A | * | 9/1999 | Lin et al. ..................... 708/700 |
| 6,061,783 | A | | 5/2000 | Harriman |
| 6,081,824 | A | * | 6/2000 | Julier et al. .................. 708/653 |
| 6,237,016 | B1 | * | 5/2001 | Fischer et al. ............... 708/622 |

FOREIGN PATENT DOCUMENTS

| EP | 0 171 190 | 2/1986 |
| EP | 0 540 150 | 5/1993 |
| EP | 0 945 783 | 9/1999 |
| GB | 2 343 969 | 5/2000 |

* cited by examiner

*Primary Examiner*—Chuong Dinh Ngo

(74) *Attorney, Agent, or Firm*—Nixon & Vanderhye P.C.

(57) ABSTRACT

A data processing system is provided with an instruction (ADD8TO16) that unpacks non-adjacent portions of a data word using sign or zero extension and combines this with a single-instruction-multiple-data type arithmetic operation, such as an add, performed in response to the same instruction. The instruction is well suited to use within systems having a data path (2) including a shifting circuit (6) upstream of an arithmetic circuit (8).

15 Claims, 4 Drawing Sheets

SINGLE INSTRUCTION MULTIPLE DATA PROCESSING

This application claims priority to United Kingdom Application No. 0024311.3 filed Oct. 4, 2000, the entire contents of which are incorporated herein by reference.

BACKGROUND OF THE INVENTION

1. Field of the Invention

This invention relates to the field of data processing systems. More particularly, this invention relates to data processing system in which it is desired to provide single instruction multiple data type operation.

2. Description of the Prior Art

Single instruction multiple data operation is a known technique whereby data words being manipulated in accordance with a single instruction in fact represent multiple data values within those data words with the manipulation specified being independently performed upon respective data values. This type of instruction can increase the efficiency with which a data processing system may operate and is particularly useful in reducing code size and speeding up processing operation. The technique is commonly, but not exclusively, applied to the field of manipulating data values representing physical signals, such as in digital signal processing applications.

When extending the data processing capabilities of a data processing system, an important consideration is the extent of any size, complexity, cost and power consumption overheads that may be introduced to support the additional processing capability. Measures that can add processing capability whilst reducing the additional overhead incurred are strongly advantageous.

SUMMARY OF THE INVENTION

Viewed from one aspect the present invention provides apparatus for data processing, said apparatus comprising a shifting circuit, an arithmetic circuit; and an instruction decoder responsive to an instruction to control said shifting circuit and said arithmetic circuit to perform an operation upon a data word Rn and a data word Rm, wherein said operation yields a value given by selecting a plurality of non-adjacent multibit portions of said data word Rm to form a plurality of multibit portions each of bit length A; optionally shifting said plurality of multibit portions by a common shift amount to shifted bit positions; promoting each of said plurality of multibit portions from said bit length of A to a bit length of B to form a plurality to promoted multibit portions, such that said promoted multibit portions may be abutted to form a promoted data word P; and performing a plurality of independent arithmetic operations using as input operands respective bit position portions of bit length B from both said promoted data word P and said data word Rn to form a result data word Rd.

The invention provides a new data processing instruction within a data processing system that may serve to unpack data values held within a data word and also perform a single-instruction-multiple-data type arithmetic operation upon the unpacked data values. The invention recognises that by unpacking non-adjacent data values within a data word may be implemented with considerably less additional overhead than conventional unpacking instructions which unpack adjacent data values. In particular, the need for additional data pathways that can diverge the bit positions of previously adjacent data values may be avoided. Instead, for example, already present masking and word shifting circuitry may be utilised. Furthermore, the simplification of the unpacking function allows the possibility for a single instruction to also provide an arithmetic operation upon the operands without introducing processing cycle constraint problems.

Whilst in its general form the invention may be applied to the selection of non-adjacent multibit portions of arbitrary length compared to their promoted length, particularly efficient and convenient implementations are ones in which the selected multibit portions are half the length of the promoted multibit portions with the promoted multibit portions being abutted within a promoted data word so as to have a length equal to the length of the input data words to the operation.

It will be appreciated that the promotion in lengths of the selected multibit portions may occur in different ways. Two particularly useful ways in which this may take place are by sign extension or by leading zero extension.

It will be appreciated that the arithmetic operation that is combined with the unpacking could take various different forms. However, particularly preferred embodiments are ones in which the arithmetic operation is an add operation performed independently upon respective promoted multibit portions. This instruction is particularly useful in many real life data processing situations, such as during the calculation of a sum of absolute differences as part of MPEG motion compensation calculations.

As previously mentioned, the invention is able to make use of existing processing resources within a data processing system in a more effective manner. This is particularly the case in a system in which a shifting circuit is provided upstream of an arithmetic circuit within the data path. Such an arrangement allows the unpacking, with any of the optional shifts, to be performed prior to an arithmetic operation.

In preferred embodiments, in order to provide the desired functionality without imposing additional processing cycle time constraints, a promoting circuit that is responsible for promoting the selected multibit portions in length (e.g. either by sign extension or leading zero extension) is provided in parallel with a portion of the shifting circuit and the range of common shift amounts that is specified is restricted such that a first part of the shifting circuit can be used in combination with the promoting circuit to perform the required operations without extending the time data value takes to propagate beyond that already allowed for to provide propagation through the full shifting circuit in other operations.

Viewed from another aspect the invention provides a method of data processing, said method comprising the steps of decoding and executing an instruction that yields a result given by selecting a plurality of non-adjacent multibit portions of said data word Rm to form a plurality of multibit portions of bit length A optionally shifting said plurality of multibit portions by a common shift amount to shifted bit positions; promoting each of said plurality of multibit portions from said bit length of A to a bit length of B to form a plurality of promoted multibit portions, such that said multibit portions may be abutted to form a promoted data word P; and performing a plurality of independent arithmetic operations using as input operands respective bit position portions of bit length B from both said promoted data word P and said data word Rn to form a result data word Rd.

The invention also provides a computer program product storing a computer program for controlling a general purpose computer in accordance with the above techniques, such as including a data processing instruction having the form of operation described above.

The above, and other objects, features and advantages of this invention will be apparent from the following detailed description of illustrative embodiments which is to be read in connection with the accompanying drawings.

DETAILED DESCRIPTION

Figure 1:
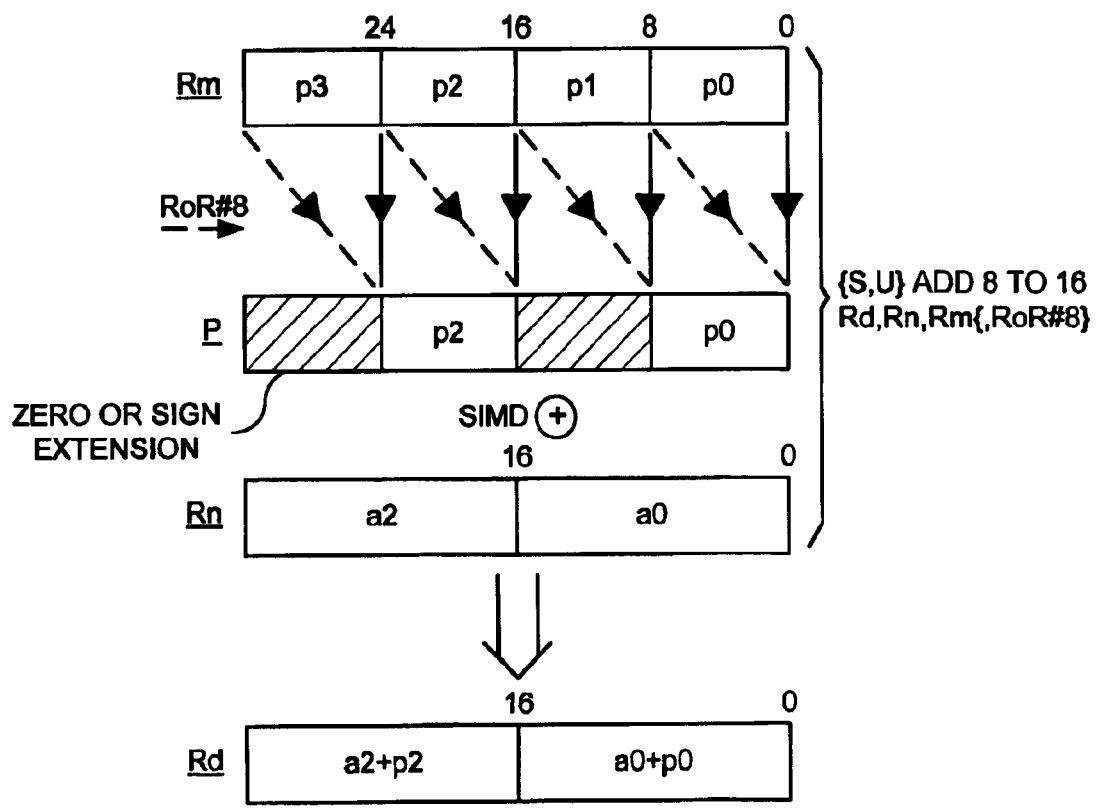
FIG. 1 schematically illustrates the action of a first SIMD type data processing instruction.

FIG. 1 illustrates the action of a first SIMD type data processing instruction termed ADD8TO16. This instruction comes in both signed and unsigned variants corresponding to the nature of the extension added to the front of a selected portion of each of the input operand data words as it is extended in length as part of the processing performed. The first input operand data word is stored within a register Rm of the data processing apparatus. The data word is formed of four 8-bit portions p0, p1, p2 and p3. Depending upon whether or not a rotate right operation of 8-bit positions is specified in the instruction, either the multibit portions p0 and p2 or alternatively the multibit portions p1 and p3 are selected out of the input data word within register Rm. The optional rotate right operation may also be by amounts of 16 and 24 if desired. This effectively allows the high and low order portions to be swapped around. The example illustrated in FIG. 1 shows the non-adjacent portions p0 and p2 being selected in the unrotated (shifted) variant with the other variant being indicated by the dotted lines.

When the multibit portions have been selected, each is promoted in length from 8 bits to 16 bits using either zero or sign extension. The shaded portions of the promoted data word P shown in FIG. 1 indicate these extension portions.

The second input data word is stored within a register Rn and comprises two 16-bit data values. The example illustrated performs a single-instruction-multiple-data add operation whereby the extended p0 value is added to the lower 16 bit value a0 of Rn whilst the extended p2 value is added to the upper 16 bit portion a2 of the Rn value. This type of addition is one which may be considered as a full width addition with the carry chain broken between the 15$^{th}$ and 16$^{th}$ bits of the result. It will be appreciated that other SIMD type arithmetic operations may be performed, such as, for example, a SIMD subtraction.

The output result data word generated by the instruction of FIG. 1 produces in the lower 16 bits the sum of p0 and a0 whilst the upper 16 bits contain the sum of p2 and a2. This instruction is particularly useful in operations that determine the sum of absolute differences between respective data values whereby the a0 and a2 represent accumulate values with the values p0 to p3 representing individual absolute values of signal difference values, such as pixel difference values. This type of operation is commonly needed in MPEG motion estimation processing and the ability to perform this operation at high speed is strongly advantageous.

Figure 2:
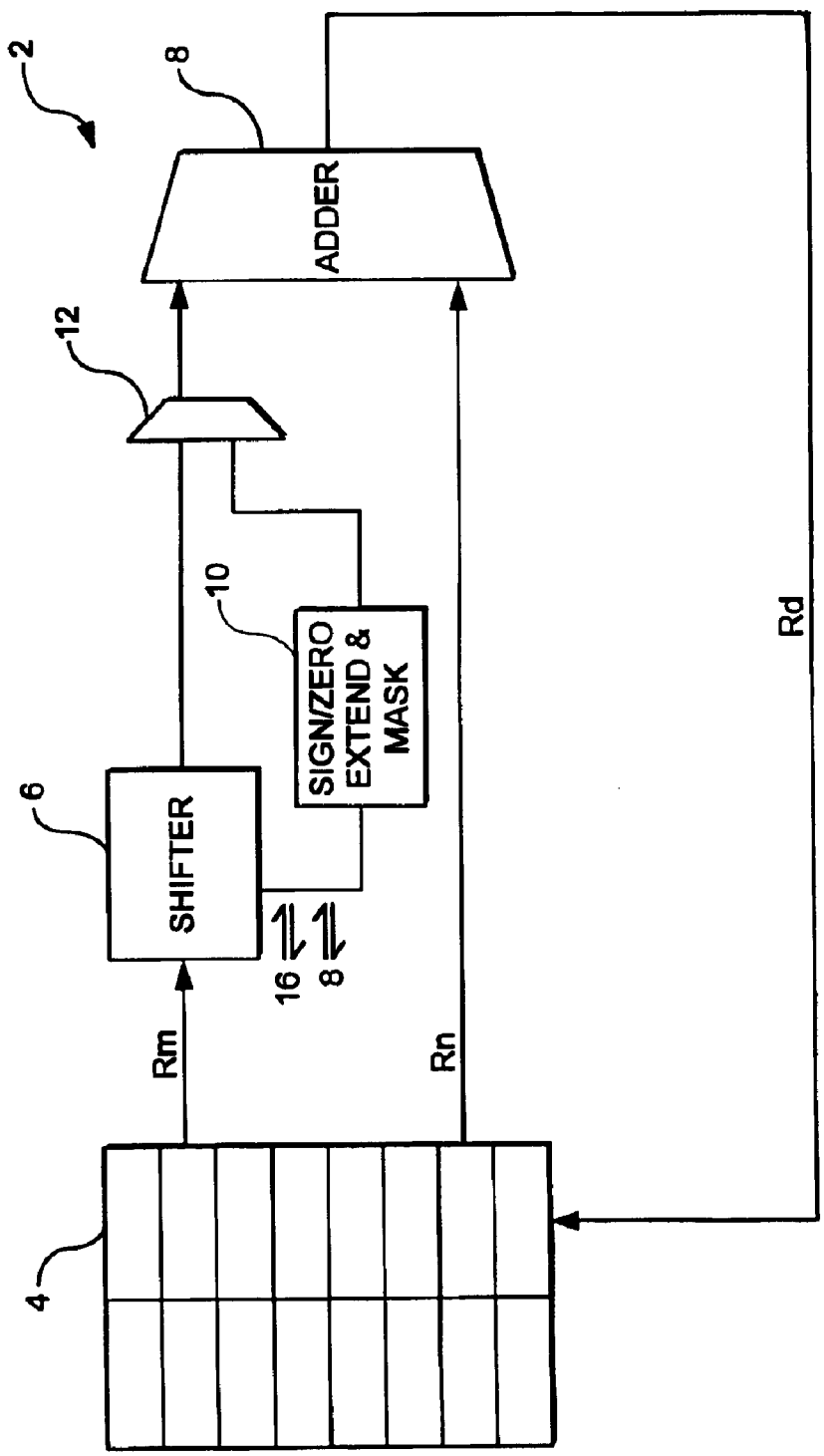
FIG. 2 schematically illustrates a data path within a processing apparatus of a type well suited to executing the data processing instruction of FIG. 1.

FIG. 2 illustrates an example data path 2 of a data processing system that may be used to implement the instruction of FIG. 1. A register bank 4 holds 32-bit data words to be manipulated. Both the input operand data words stored in Rm and Rn are read from this register bank and the resulting data word is written back to register Rd in the register bank 4. The data path 2 includes a shifting circuit 6 and an adder circuit 8. The many other data processing instructions provided by the system utilise this shifting circuit 6 and adder circuit 8 in various different ways. Such a data path 2 is carefully designed so that the time taken for a data value to propagate through the shifting circuit 6 and the adder circuit 8 is well matched to the data processing cycle time. Efficient use of the hardware resources of the data path 2 is made in systems in which those resources are active for a high proportion of every data word propagating through the data path 2. A sign/zero extending and masking circuit 10 is provided in parallel with a lower portion of the shifting circuit 6. A multiplexer 12 is able to select either the output of the full shifting circuit 6 or the output of the sign/zero extending and masking circuit 10 as one of the inputs to the adder circuit 8. The other input to the adder circuit 8 is the input operand data word of Rn.

When executing the instruction of FIG. 1, the input operand data word of Rm is supplied to the shifting circuit 6 in which an optional right shift of 8-bit positions is applied to the data word in dependence upon whether or not that parameter was specified within the instruction. Optional right rotates of 16 and 24 bit positions may also be applied. Within a multilevel multiplexer based shifter, such a restricted possibility shift may be provided relatively simply from a first portion of the shifting circuit 6 (e.g. in the case of a 32-bit system the first level of multiplexer may provide 16 bits of shift and the second level of mulitplexer provides 8 bits of shift). Accordingly, a value optionally shifted by the specified amount can be tapped off from part way through the shifting circuit 6 and supplied to the sign/zero extending and masking circuit 10. This circuit 10 operates to mask out the non-selected multibit portions of the possibly shifted input operand data word of Rm and replace these masked out portions with either zeros or a sign extension of their respective selected multibit portions. The output of the sign/zero extending and masking circuit 10 passes via a multiplexer 12 to a first input of the adder circuit 8. The second input of the adder circuit 8 is the input operand data word of Rn. The adder circuit 8 performs a SIMD add upon its inputs (i.e. two parallel 16-bit adds with the carry chain effectively broken between bit positions 15 and 16). The output of the adder circuit 8 is written back into register Rd of the a register bank 4.

As an alternative, the sign/zero extending and masking circuit 10 may take Rm (unrotated) as its input and then itself perform a rotate of 0, 8, 16 or 24 upon the four possible sign bits and then create the mask. The shifting circuit 6 would operate in parallel to shift the whole 32 bits of Rm.

Figure 3:
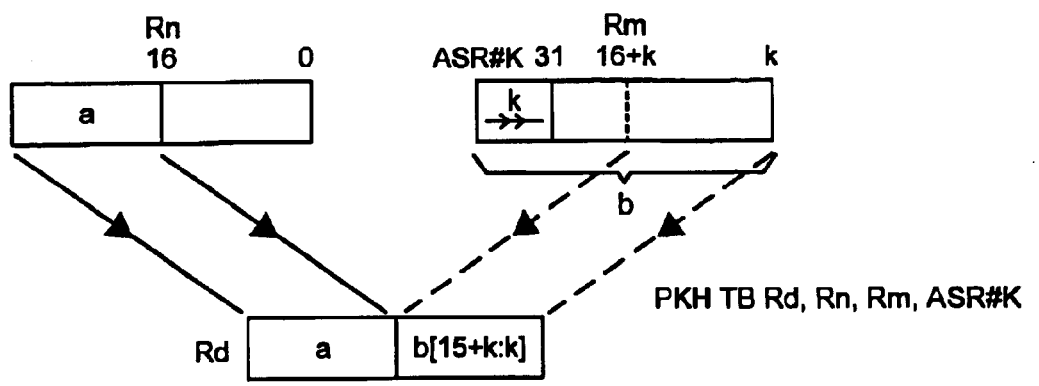
FIGS. 3 and 4 schematically illustrate two variants of a further SIMD type data processing instruction.
Figure 4:
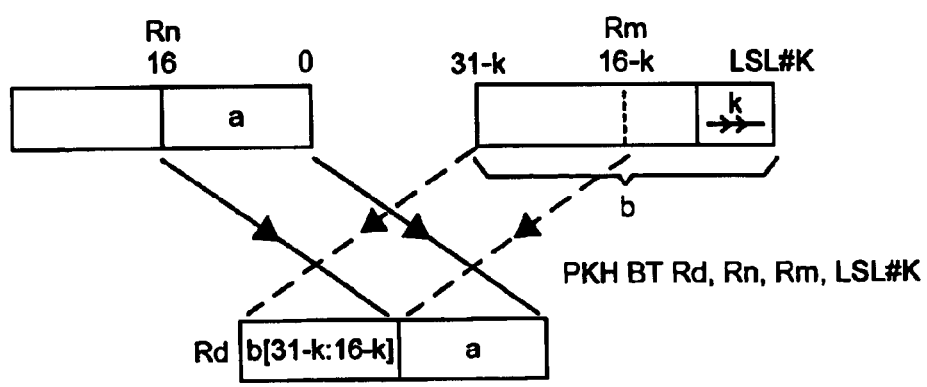

FIGS. 3 and 4 illustrate two variants of a half word packing SIMD type instruction. The PKHTB instruction of FIG. 3 takes a fixed top half of one input operand data word stored in register Rn and a variable position half bit portion of a second input operand data word stored in register Rm and combines these into respectively the top half and the bottom half of an output data word to be stored in register Rd. The instruction PKHBT takes the bottom half of an input operand data word of Rn and a variable position half word length portion of a second input operand data word of Rm and combines these respectively into the bottom and top halves of an output data word of Rd. It will be seen that the selected portion of the input operand data word of Rn in either case is unshifted in its location within the output data word Rd. This allows this portion to be provided by a simple masking or selecting circuit representing very little additional hardware overhead. The variable position half word portion of the instruction of FIG. 3 is selected from bit positions 15 to 0 of the word of Rm after that word has been right shifted by k bit positions. Similarly, the half word length variable position portion of Rm selected in accordance with the instruction of FIG. 4 is selected from bit positions 31 to 16 of the word of Rm after that word has been left shifted by k bit positions.

The variable shifting provided in combination with the packing function of the instructions of FIG. 3 and FIG. 4 is particularly useful for adjusting changes in the "Q" value of fixed point arithmetic values that can occur during manipulation of those values.

Figure 5:
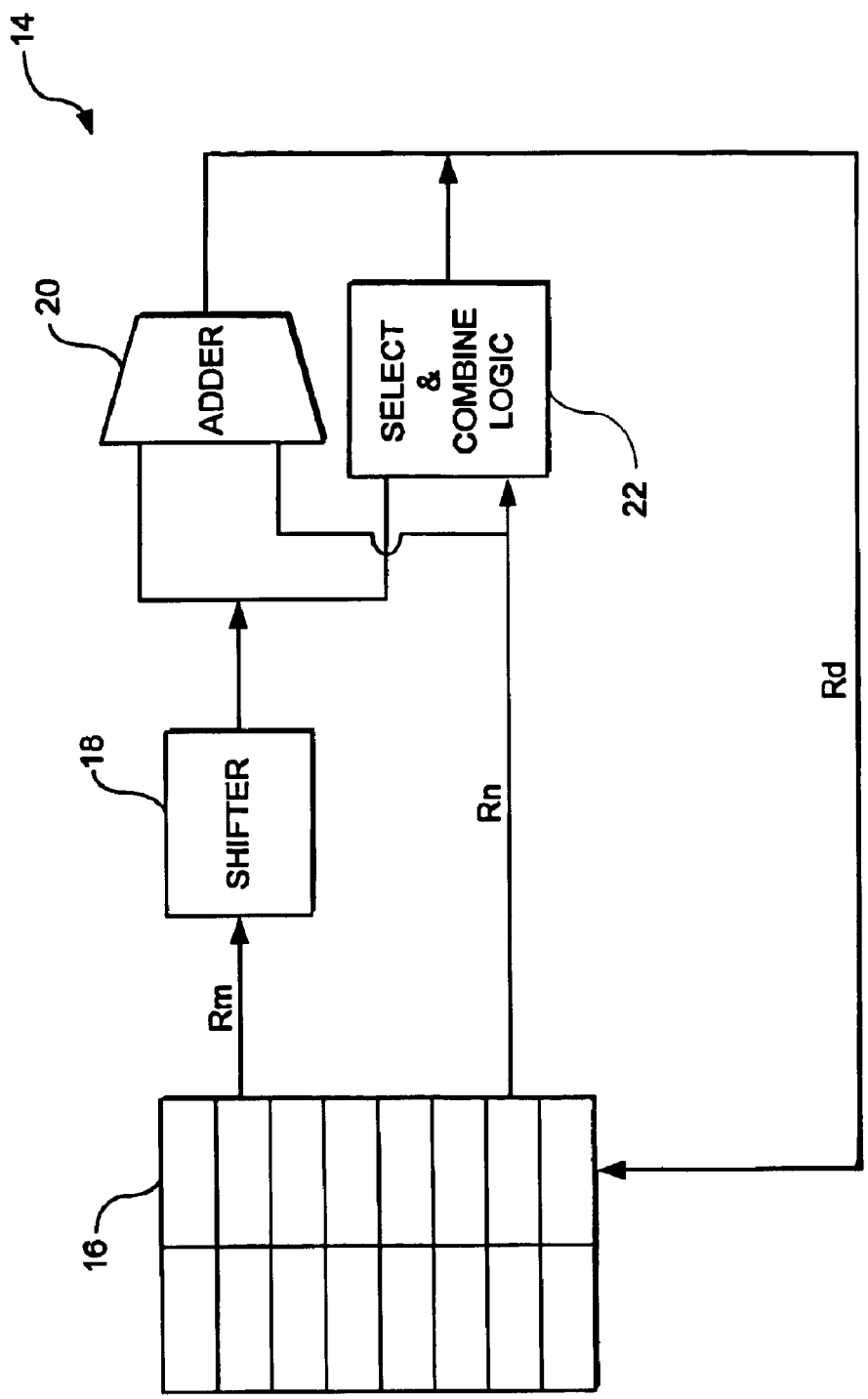
FIG. 5 schematically illustrates data path of a data processing system well suited for executing the data processing instructions of FIGS. 3 and 4.

FIG. 5 illustrates a data path 14 that is particularly well suited for performing the instructions of FIGS. 3 and 4. A register bank 16 again provides the input operand data words, being 32-bit data words in this example, and stores the output data word. The data path includes a shifting circuit 18, an adder circuit 20 and a selecting and combining circuit 22.

In operation, the unshifted input operand data word of Rn passes directly from the register bank 16 to the selecting and combining logic 22. In the case of instruction of FIG. 3, the most significant 16 bits of the value of Rn are selected and form the corresponding bits within the output data word Rd. In the case of the instruction of FIG. 4 it is the least significant 16 bits of the input operand data word of Rn that are selected and passed to form the least significant bits of the output data word Rd. The input operand data word of Rm passes through the full shifting circuit 18. In the case of the instruction of FIG. 3, an arithmetic right shift of k bit positions is applied and then the least significant 16 bits from the output of the shifting circuit 18 are selected by the selecting and combining circuit 22 to form the least significant 16 bits of the output data word of Rd. In the case of the instruction of FIG. 4, the shifting circuit 18 provides a left logical shift of k bit positions and supplies the result to the selecting and combining circuit 22. The selecting and combining circuit 22 selects the most significant 16 bits of the output of the shifting circuit 18 and uses these to form the most significant 16 bits of the output data word of Rd.

It will be seen that the selecting and combining circuit 22 is provided in a position in parallel with the adder circuit 20. Accordingly, given that the data path 14 is carefully designed to allow for a full shift and add operation to be performed within a processing cycle, the relatively straight forward operation of selecting and combining can be provided within the time period normally allowed for the operation of the adder circuit 20 without imposing any processing cycle constraints.

It will be understood that the data processing instructions explained above and as defined in the claims have been defined in terms of the result value achieved. It will be appreciated that the same result value can be achieved with many different processing steps and orders of steps. The invention encompasses all of these variants that produce the same final result value using a single instruction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Apparatus for data processing, said apparatus comprising:
   (i) a shifting circuit;
   (ii) an arithmetic circuit; and
   (iii) an instruction decoder responsive to an instruction to control said shifting circuit and said arithmetic circuit to perform an operation using a first input data word and a second different input data word, wherein said operation yields a result value given by:
   (iv) selecting a plurality of non-adjacent multibit portions of said first input data word to form a plurality of multibit portions each of bit length A;
   (v) optionally shifting said plurality of non-adjacent multibit portions by a common shift amount to shifted bit positions;
   (vi) promoting each of said plurality of non-adjacent multibit portions from said bit length of A to a bit length of B to form a plurality of promoted multibit portions, such that said promoted multibit portions may be abutted to form a promoted data word; and
   (vii) performing a plurality of independent arithmetic operations using as input operands respective bit position portions of bit length B from both said promoted data word and said second different input data word to form a result data word.

2. Apparatus as claimed in claim 1, wherein B=2*A.

3. Apparatus as claimed in claim 1, wherein said plurality of multibit portions are shifted to shifted bit positions such that a lowest bit position multibit portion extends up from a zeroth order bit position.

4. Apparatus as claimed in claim 1, wherein promoting said multibit portions from a bit length of A to a bit length of B comprises one of:
   (i) sign extending said multibit portions to a bit length of B; and
   ii) zero extending said multibit portions to a bit length of B.

5. Apparatus as claimed in claim 1, wherein said plurality of independent arithmetic operations are independent add operations.

6. Apparatus as claimed in claim 1, wherein said first input data word and said second different input data word each have a bit length of C and C=N*B, where N is an integer greater than 1.

7. Apparatus as claimed in claim 6, wherein C=B*2.

8. Apparatus as claimed in claim 1, wherein B=16 and A=8.

9. Apparatus as claimed in claim 1, wherein said common shift amount is B−A.

10. Apparatus as claimed in claim 1, wherein said instruction is a single-instruction-multiple-data instruction.

11. Apparatus as claimed in claim 1, wherein said instruction combines a data value unpack operation with an arithmetic operation.

12. Apparatus as claimed in claim 1, wherein said shifting circuit is upstream of said arithmetic circuit in a data path of said apparatus.

13. Apparatus as claimed in claim 1, wherein a promoting circuit operable to promote said multibit portions from a bit length of A to a bit length of B is disposed in parallel to a portion of said shifting circuit, said shifting circuit being operable to provide a restricted range of common shift amounts for data values passing through said shifting circuit when executing said instruction compared to a range of common shift amounts provided by said shifting circuit when executing other instructions.

14. A method of data processing, said method comprising the steps of decoding and executing an instruction on a first input data word and a second, different input data word that yields a result value given by:
   (i) selecting a plurality of non-adjacent multibit portions of said first input data word to form a plurality of multibit portions of bit length A;
   (ii) optionally shifting said plurality of non-adjacent multibit portions by a common shift amount to shifted bit positions;
   (iii) promoting each of said plurality of non-adjacent multibit portions from said bit length of A to a bit length of B to form a plurality of promoted multibit portions, such that said promoted multibit portions may be abutted to form a promoted data word; and
   (iv) performing a plurality of independent arithmetic operations using as input operands respective bit position portions of bit length B from both said promoted data word and said second, different input data word to form a result data word.

15. A computer program product comprising a computer program for controlling a computer to perform a method as claimed in claim 14.

* * * * *

UNITED STATES PATENT AND TRADEMARK OFFICE
CERTIFICATE OF CORRECTION

PATENT NO. : 6,999,985 B2  Page 1 of 1
APPLICATION NO. : 09/941790
DATED : February 14, 2006
INVENTOR(S) : Symes et al.

It is certified that error appears in the above-identified patent and that said Letters Patent is hereby corrected as shown below:

On the title page of the patent, in the left column, under the heading entitled Notice, delete "This patent is subject to a terminal disclaimer."

Signed and Sealed this

Twelfth Day of September, 2006

JON W. DUDAS
*Director of the United States Patent and Trademark Office*